Nov. 26, 1963  L. HUNTER  3,111,773
TORSION BAR HEIGHT GAUGE
Filed May 9, 1960  2 Sheets-Sheet 2
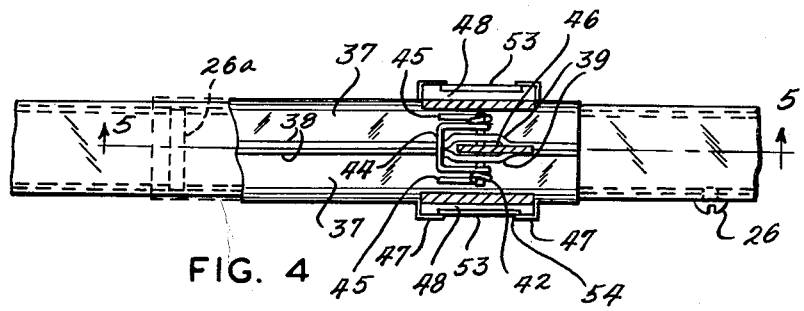
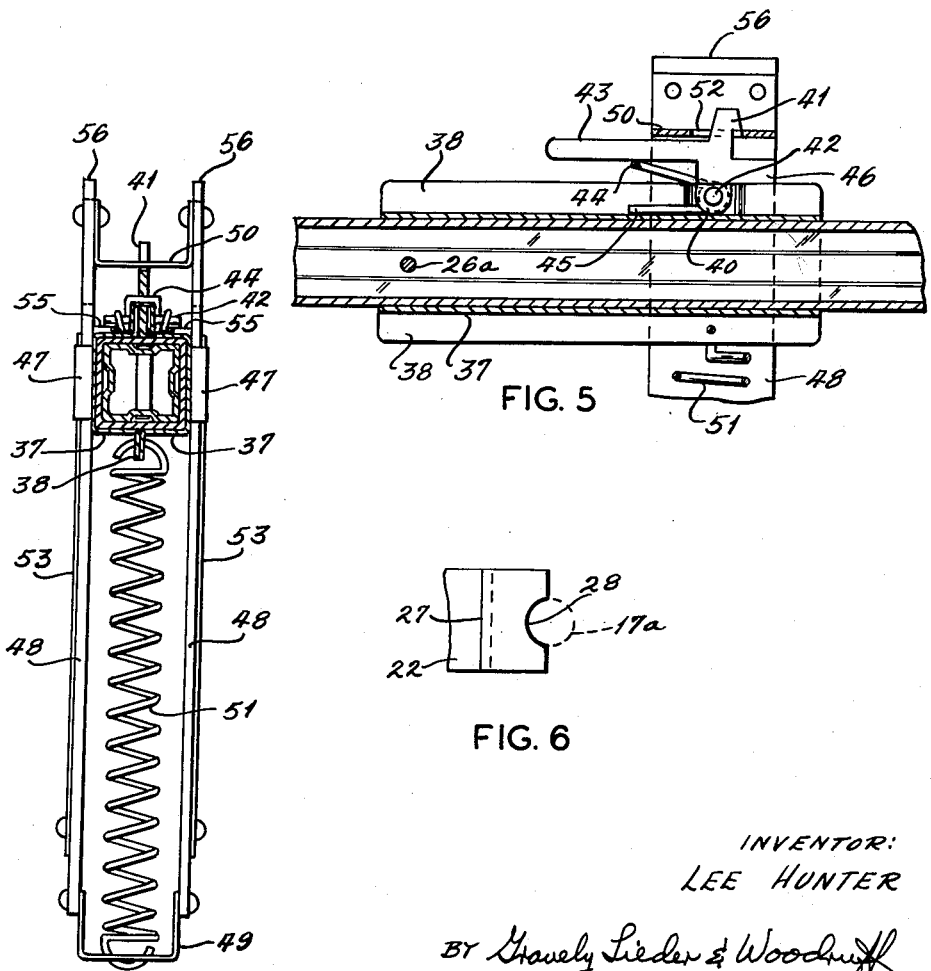
INVENTOR:
LEE HUNTER
BY Gravely Lieder & Woodruff
ATTORNEYS, United States Patent Office 3,111,773
Patented Nov. 26, 1963

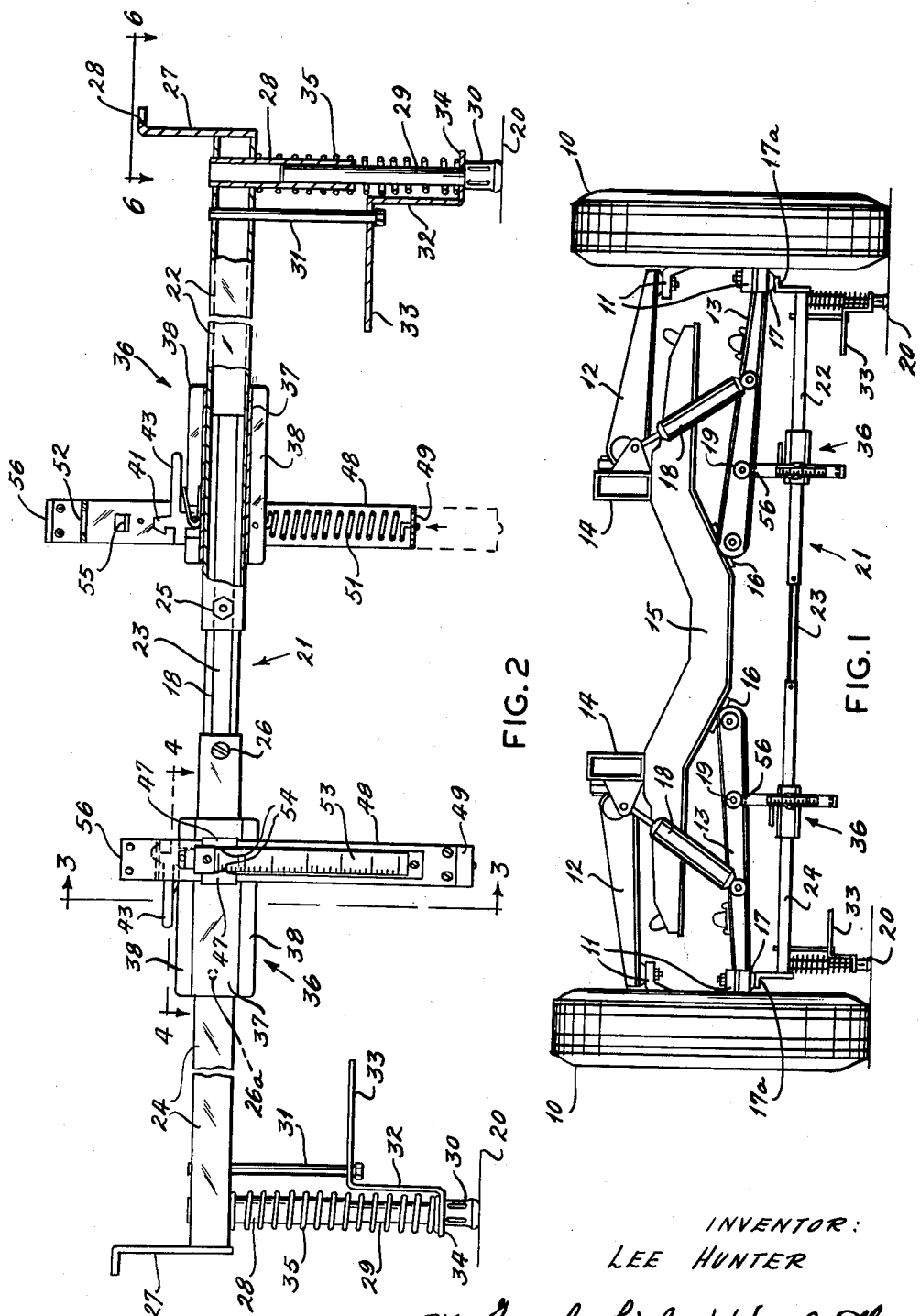

3,111,773
TORSION BAR HEIGHT GAUGE
Lee Hunter, Rte. 1, Box 136, Creve Coeur, Mo.
Filed May 9, 1960, Ser. No. 27,695
5 Claims. (Cl. 33—181)

This invention relates to a measuring gauge for checking the levelness of a vehicle through measurement of torsion bar suspension means incorporated in the vehicles.

In vehicles provided with adjustable torsion bar suspension means or systems it has been difficult to check the torsion bars so that the vehicle will sit level, or to reset the adjustment of the torsion bar means to restore levelness of the vehicle after use. The popularity and advantages of torsion bar suspension means is, of course, well established, and its use has extended to a variety of different sizes of vehicles so that a gauge adapted for one size vehicle is not useful for other size vehicles.

The present invention, therefore, is directed to improvement in torsion bar height gauges which are adapted to all vehicle sizes and torsion bar suspension means so that one gauge may be used for all systems to simplify the work of obtaining the desired measurements.

The many objects and features of this invention will become apparent to those skilled in this art as the description of a preferred form of the gauge is set forth, reference being had to the accompanying drawings, wherein:

FIG. 1 is a schematic view in front elevation of a vehicle having torsion bar suspension means, only so much of the vehicle frame and suspension being shown as will serve to illustrate the principles of the gauge;

FIG. 2 is an enlarged assembly view of the improved gauge forming the subject matter of this invention, with portions thereof being shown in section;

FIG. 3 is an enlarged and transverse sectional view taken at line 3—3 in FIG. 2;

FIG. 4 is an enlarged and fragmentary plan view taken at line 4—4 in FIG. 2;

FIG. 5 is an enlarged fragmentary sectional elevational view taken at line 5—5 in FIG. 4; and FIG. 6 is a fragmentary view seen at line 6—6 in FIG. 2.

In the view of FIG. 1 the vehicle front wheel suspension assembly has been illustrated schematically to provide a basis for understanding the principle of operation of the gauge device. In general, the steerable wheels 10 each have a spindle bracket 11 to which is connected an upper control arm 12 and a lower control arm 13. The vehicle frame includes spaced longitudinal members 14 and a front cross member 15, these parts of the frame providing attachment points for the respective control arms, as is understood. The lower control arms 13 are hinged at 16 to the member 15 and are connected to the spindle brackets 11 by suitable ball joints 17. The arms 13 are cushioned by shock struts 18, as shown, and the forward ends of torsion bars 19, are anchored to each arm 13 to exert a force or load thereon which holds the vehicle frame members 14 and 15 suspended between the wheels 10. As the vehicle frame moves up and down in response to road conditions, or as the wheels 10 move up or down relative to the frame, the torsion bars 19 twist or wind up, or unwind. While not necessary to show, the bars 19 extend rearwardly along the frame members 14 and are adjustably attached at their rearward ends to other parts of the vehicle frame in such manner that the degree of torsion therein may be varied to sustain the vehicle frame at any desired height above the surface or road 20. Generally speaking, the torsion bars 19 of the vehicle suspension system are arranged substantially perpendicular to the lengthwise axis of arms 13 to avoid eccentric torsion reaction. Since the arms 13 are canted relative to the longitudinal dimension or axis of the vehicle frame, the torsion bars 19 generally extend in non-parallel relation to each other.

It is, of course, desirable to make adjustments so that the vehicle will stand or ride in a level attitude, and this is accomplished by adjusting each torsion bar 19 so that the associated control arm 13 exerts more or less upward force on the cross member 15 to get it to a level attitude relative to the fixed positions of the ball joints 17 at the wheel brackets 11. Since the wheels 10 and the spindle brackets 11 are fixed with respect to the ground or surface 20, the ball joints 17 provide surfaces which are useful reference points to which the gauge device 21 is applied.

In FIGS. 1 and 2, the gauge 21 comprises a supporting member which is in the form of a three-piece bar adjustable as to length and made up of a right hand tubular section 22 telescopically receiving a center section 23, and a left hand tubular section 24 slidably telescoped over the center section 23. The center section 23 is locked or pinned to the section 22 by a suitable screw 25 (FIG. 2). The left hand section 24 is free to slide over the center section 23 between a position of abutment with the inner end of right hand section 22 and an extended position wherein a stop screw 26 strikes a pin 26a fixed in section 23 and covered by the section 24. The screw 26 is removable for disassembly of the gauge.

The right hand section 22 of the gauge 21 is provided with a gauging element 27 at its outer end having a reference surface or notch 28 which abuts a surface 17a (FIG. 6) of the ball joint 17. A similar gauging element 27 is provided on the movable section 24. The two gauging elements 27 extend from the bar the same distance so that the gauge 21 is located at the same elevation relative to the fixed points 17 at the wheel brackets 11. The right hand section 22 is also provided with a resilient supporting foot assembly to hold the element 27 in position. The foot assembly includes a guide sleeve 28 receiving a rod 29 therein with a free end 30 forming a foot to engage surface 20. A guide rod 31 fixed in section 22 is parallel with the guide tube 28 and guides an actuator 32. The handle 33 of the actuator 32 moves adjacent the rod 31 and the opposite end 32 is secured to the rod 29 adjacent the foot 30. A spring 35 bears upon the actuator end 34 and under the tubular section 22 to extend the rod 29 so that the foot 30 is pressed down against the surface 20, and this action raises the gauging element 27 to retain it against the surface 17a of the ball joint 17. The movable section 24 at the left end of the guage is similarly provided with a supporting foot assembly and the parts are indicated by similar reference numerals.

In FIG. 2, the gauge device 21 is shown with a pair of adjustable slides 36 which are similar in construction but arranged as right and left hand parts on the respective tubular sections 22 and 24 of the bar. Since the parts are essentially the same, the same reference numerals will be applied to similar parts and the following description will be given in reference to the left hand slide 36. The slide is provided with a body made of identical half parts 37 connected at the flanges 38 in such manner that the body 37 is slidable on the tubular section 24. The upper pair of flanges 38 (FIGS. 4 and 5) are suitably joggled at 39 to form a pocket which pivotally receives the ear 40 of a catch element 41. The ear is pivoted on a pin 42. The catch element 41 has an arm 43 which is urged upwardly by the closed end 44 of a mouse trap type spring mounted on the pin 42 with its ends 45 pressed against the upper surface of the body 37 on each side of the flanges 38. The catch element is also formed with a stop 46 opposite the arm 43, said stop 46 bearing upon the flanges 38 in response to the action of spring end 44.

The slide body parts 37 (FIGS. 2, 3 and 4) are formed with cooperating side ears 47 which are outstruck from the parts 37 and form guides for vertically movable scale arms 48. The lower ends of the arms 48 are connected by a U-shaped strap 49 and a similar U-shaped strap 50 connects the upper ends of the arms 48 so that the arms are held in parallel positions to move through the guide ears 47 as shown in the view of FIG. 2. An actuator spring 51 for each pair of arms 48 is connected at the lower strap 49 and to the lower flanges 38 on the slide 36. The spring 51 urges the arms upwardly when the catch 41 is released from engaging in a suitable slot 52 in the upper strap 50 by depressing the arm 43 against spring 44. Each arm 48 carries a suitable measuring scale 53 to be visible from either side of the gauge device. The scales 53 cooperate with pointer nibs 54 formed on the guide ears 47 (FIG. 2). In order to determine the desired depressed position (as to the left side in FIG. 2) of the vertically movable scales 53, each scale carrying arm 48 has an inturned stop element 55 which, as seen in FIG. 3, abuts the upper surface of the slide body concurrently with the catch 41 engaging in the slot 52 (FIG. 5). When in such position the upper edges 56 of the arms 48 are held in positions to lie on a line between the upper ends of the gauging element 27 carried at the outer ends of the bar sections 22 and 24. The right hand slide 36 in FIG. 2 is illustrated with its arms 48 in raised position to demonstrate the action of the parts under the tension of spring 51 when catch 41 is freed from slot 52.

In operation, the gauge device 21 is first adjusted as to length of the bar by sliding the left hand bar 24 in or out as the case may be, until the gauging elements 27 match the spacing of surfaces 17a in the vehicle suspension system. With each pair of arms 48 held in the depressed position by catches 41, the operator compresses the supporting feet 30 by using handles 33 and positions the device as shown in FIG. 1. Of course, the vehicle wheels 10 are properly inflated and located on a flat surface 20. With the device thus positioned each slide 36 is adjusted to the right or left on its bar section until the edges 56 line up under the ends of the torsion bars 19. Catches 41 may be released so that the scale carrying arms 48 are raised by the springs 51 into abutment with the torsion bars 19. The measurement at each slide 36 is compared and if equal the suspension system is level. If the scales 53 show different readings, the torsion bars 19 are adjusted until levelness is obtained. Such adjustments as appear needed may be observed from beneath the vehicle, as well as from the front. It is readily apparent that the feet 30 retain the gauge device 21 in operative position so that a continuous observation may be obtained. Moreover, the adjustments in bar length between elements 27, and the adjustments for each slide 36 makes the gauge useful for all vehicle sizes.

What is claimed is:
1. A gauge device for determining the levelness of a vehicle torsion bar suspension system of the type having at least one surface at each wheel which is relatively stationary with respect to the vehicle, said device including a gauge bar having a movable section to adjust the bar length, a gauging element adjacent each end of said bar engageable with the stationary surfaces at the vehicle wheels, spring-pressed feet on said bar to support said bar in position with said gauging elements engaged on the stationary surfaces at the vehicle wheels, and yieldable measuring slides carried by said bar including scales movable transversely of said bar into positions in abutting engagement with the torsion bars of the suspension system and adapted to move with the torsion bars during adjustments for levelling the vehicle.

2. A levelness gauging device for a vehicle torsion bar suspension system having lower control arms connected to vehicle wheels at pivot points normally at fixed distances from a vehicle supporting surface and torsion bars resiliently loading the control arms to support the vehicle, said levelness gauging device including a bar extending between the pivot points on the vehicle wheels, gauging elements on said bar to engage the wheel pivot points, means on said bar engaging the vehicle supporting surface and resiliently retaining said bar in position with said elements engaged on the pivot points, and a pair of slides on said bar longitudinally movable into alignment under the torsion bars, each slide including a scale movable transversely of said bar and resiliently urged into a position related to a torsion bar to measure the distance from said bar to each of the torsion bars.

3. A levelness determining gauge for a vehicle having a torsion bar suspension system in which control arms are resiliently supported by the torsion bars and have reference points of connection with the vehicle wheels, said gauge including a longitudinally adjustable support member to span the distance between the vehicle reference points at the wheels, similar gauging elements on said member to engage the reference points on the vehicle, yieldable means on said member engageable with the surface on which the vehicle sits and sustaining said member in a position with said gauging elements on the reference points, and calibrated measuring means movable between said member and the torsion bars in the vehicle suspension system to determine the distance of each torsion bar from said member.

4. A levelness determining gauge for a vehicle having a torsion bar suspension system in which control arms are resiliently supported by the torsion bars and have reference points of connection with the vehicle wheels, said gauge including a longitudinally adjustable support member to span the distance between the vehicle reference points at the wheels, similar gauging elements on said member to engage the reference points on the vehicle, means on said member engageable with the surface on which the vehicle sits and sustaining said member in a position with said gauging elements on the reference points, and calibrated measuring means movable relative to said member and in a direction toward and away from the torsion bars in the vehicle suspension system to determine the distance of each torsion bar from said member, said last means being adjustable bodily along the length of said member to conform to the spacing of the torsion bars and including locking elements releasably retaining said measuring means against said relative movement.

5. A gauge device for determining the levelness of a vehicle torsion bar suspension system of the type having at least one surface at each wheel which is relatively stationary with respect to the vehicle, said device including a gauge bar positionable between the vehicle wheels, a gauging element adjacent each end of said bar in position to engage the stationary surfaces at the vehicle wheels, supporting means for said bar carried by said bar and engageable with the surface on which the vehicle sits and retaining said gauging elements in engagement with the stationary surfaces at the vehicle wheels, and measuring slides carried by said bar including scales movable transversely of said bar into positions measuring the distance between the torsion bars of the suspension system and the gauging bar, said slides being relatively movably adjustable on said bar to positions substantially aligned with the torsion bars of the suspension system, and said supporting means for said bar being disposed adjacent the ends of said bar so as to be between the gauging elements adjacent each end of said bar and said measuring slides.

References Cited in the file of this patent
UNITED STATES PATENTS

| | | |
|---|---|---|
| 1,560,521 | Andrews | Nov. 10, 1925 |
| 2,110,895 | Verdier | Mar. 15, 1938 |
| 2,556,227 | Shaw | June 12, 1951 |
| 2,624,944 | Pujda | Jan. 13, 1953 |
| 2,900,734 | Richards | Aug. 25, 1959 |